US006952515B2

United States Patent
Kuksenkov et al.

(10) Patent No.: US 6,952,515 B2
(45) Date of Patent: Oct. 4, 2005

(54) NON-LINEAR POSITIVE DISPERSION OPTICAL FIBER

(75) Inventors: Dmitri V. Kuksenkov, Painted Post, NY (US); Ming-Jun Li, Horseheads, NY (US); Daniel A. Nolan, Corning, NY (US)

(73) Assignee: Corning Incorporated, Corning, KY (US)

( * ) Notice: Subject to any disclaimer, the term of this patent is extended or adjusted under 35 U.S.C. 154(b) by 156 days.

(21) Appl. No.: 10/449,970

(22) Filed: May 30, 2003

(65) Prior Publication Data

US 2004/0240815 A1 Dec. 2, 2004

(51) Int. Cl.⁷ .............................. G02B 6/02; G02B 6/22
(52) U.S. Cl. ...................... 385/123; 385/122; 385/127
(58) Field of Search .................................. 385/122–128

(56) References Cited

U.S. PATENT DOCUMENTS

| 4,165,223 | A | | 8/1979 | Powers .............................. 65/2 |
| 6,496,615 | B2 | * | 12/2002 | Okuno ........................ 385/122 |
| 6,661,958 | B2 | * | 12/2003 | Hirano et al. ................ 385/127 |
| 2002/0057880 | A1 | | 5/2002 | Hirano et al. ................ 385/127 |
| 2002/0102082 | A1 | | 8/2002 | Sarchi et al. ................ 385/123 |
| 2002/0135866 | A1 | | 9/2002 | Sasaoka et al. .............. 359/334 |
| 2003/0095767 | A1 | | 5/2003 | Hiroishi et al. ............. 385/126 |
| 2004/0071419 | A1 | * | 4/2004 | Berkey et al. ............... 385/123 |

FOREIGN PATENT DOCUMENTS

| EP | 1 054 275 A1 | 11/2000 | ............ G02B/6/16 |
| EP | 1 130 428 A1 | 9/2001 | ............ G02B/6/16 |

OTHER PUBLICATIONS

Kuksenkov et al. "Simultaneous 2R regeneration and dynamic dispersion compensation at 40 Gb/s in a nonlinear fiber–based device", XP–002298728, PD5–1—PD5–3, Optical Fiber Communication (OFC), Trends in Optics and Photonics Series vol. 86, Postdeadline Papers, vol. 3, Mar. 28, 2003.

* cited by examiner

*Primary Examiner*—Akm Enayet Ullah
*Assistant Examiner*—Omar Rojas
(74) *Attorney, Agent, or Firm*—Kevin M. Able

(57) ABSTRACT

The present invention comprises an optical fiber have a small effective area and a positive dispersion suitable for use in the reshaping and regeneration of optical signals. The optical fiber according to the present invention has an effective area between about 10 $\mu m^2$ and 16 $\mu^2$, and a total dispersion between about 4 ps/nm/km and 8 ps/nm/km. Also disclosed is a method of making the inventive fiber wherein a high core relative refractive index can be achieved.

11 Claims, 12 Drawing Sheets

NON-LINEAR POSITIVE DISPERSION OPTICAL FIBER

BACKGROUND OF THE INVENTION

1. Field of the Invention

The invention relates to an optical fiber having a refractive index profile, a core radius, and a refractive index profile which provide a high non-linearity coefficient.

2. Technical Background

Refractive index profile design has evolved as optical telecommunications systems requirements have changed. The study of the refractive index profile has been driven by the need for such optical fiber features as:

positioning of cut off wavelength;

positioning of zero dispersion wavelength;

lower attenuation;

improved bend resistance; and, lower total dispersion and dispersion slope.

More recently, the very high performance telecommunication systems, i.e., those which include multiplexing, high data rates, long regenerator spacing, soliton propagation, or optical amplifiers, have resulted in a broader study of refractive index profiles to include designs which yield a high effective area to minimize signal distortion and dispersion due to non-linear effects.

In certain devices, however, an increase in the non-linear index of refraction or decrease in effective area can improve performance. One notable case in which performance is enhanced by increased non-linearity is the reshaping and regeneration of optical signals (2-R regeneration).

Whenever a digital optical signal is processed, the signal is subject to distortion. Distortion is typically cumulative over time and distance, and therefore the signal must be periodically restored to maintain the information carried by the signal. Regenerators are utilized to provide this periodic restoration and restore the quality of the original data signal. Regenerators are opto-electronic devices wherein optical data is converted to an electrical signal, the signal is amplified and restored, and then the signal is converted back to an optical signal.

Previous all-optical regenerator designs have used an optical fiber that employs nonlinear propagation characteristics as a means of spectrally broadening optical pulses through self phase modulation (SPM) effects. The spectrally broadened pulses are then optically filtered, passing only light within a selected bandwidth. It has been suggested that optical fibers having a very small and negative (normal) dispersion are preferably used in such regenerators. However, the pulse broadening resulting from negative dispersion makes such fibers unattractive for wavelength division multiplexed (WDM) systems having a plurality of transmitted signals. When an optical regenerator is operated with several wavelength division multiplexed (WDM) spectral channels, small fiber dispersion will result in a strong inter-channel cross-talk through a cross-phase modulation (XPM). Using a fiber with larger negative dispersion will result in optical pulses quickly broadening in time domain and overlapping. On the other hand, if a nonlinear fiber with a relatively large positive (anomalous) dispersion is used, not only will it help minimize XPM crosstalk, but also the combined effects of SPM and dispersion will cause optical pulses to compress, so that the degree of spectral broadening required for the device operation can be achieved with less optical power and/or shorter nonlinear fiber.

What is required by devices which make use of highly non-linear waveguide fiber is that the non-linear waveguide retain such characteristics as those noted above. The difficulty of making non-linear optical fibers is therefore compounded because increased non-linearity usually requires an increased concentration of glass forming metal oxide dopants which alter the optical fiber core refractive index. The increased dopant concentration results in higher attenuation and affects mode power distribution which in turn affects the optical fiber properties required for efficient operation of a device using the non-linear optical fiber. In particular, it is difficult to attain high levels of dopant concentration in some vapor deposition methods, such as outside vapor deposition. Thus, there is a need for a positive dispersion optical fiber having a high degree of nonlinearity, and an improved method of making the high nonlinear fiber.

SUMMARY OF THE INVENTION

The optical fiber according to the present invention comprises a refractive index profile comprising a core region, a first annular region disposed about and in contact with the outer periphery of the core region, a cladding region disposed about and in contact with the outer periphery of the first annular region, and wherein the refractive index profile is selected to provide an effective area between about 10 $\mu m^2$ and 16 $\mu m^2$, and a total dispersion between about 4 ps/nm/km and 8 ps/mm/km, both at a wavelength of 1550 nm. Preferably the optical fiber has a total dispersion between about 6 ps/nm/km and 8 ps/nm/km at a wavelength of 1550 nm. Preferably the optical fiber has an α profile. Preferably α is about 2. More preferably the optical fiber has a step index core refractive index profile.

It is to be understood that both the foregoing general description and the following detailed description are merely exemplary of the invention, and are intended to provide an overview or framework for understanding the nature and character of the invention as it is claimed.

The accompanying drawings are included to provide a further understanding of the invention, and are incorporated in and constitute a part of this specification. The drawings are not necessarily to scale, and sizes of various elements may be distorted for clarity. The drawings illustrate one or more embodiment(s) of the invention, and together with the description serve to explain the principles and operation of the invention.

DETAILED DESCRIPTION OF THE PREFERRED EMBODIMENTS

Definitions

The effective area is $A_{eff}=2\pi(\int E^2 r\, dr)^2/(\int E^4 r\, dr)$, where the integration limits are 0 to ∞, and E is the electric field associated with the propagated light.

The relative refractive index, $\Delta$, is defined by the equation, $\Delta=(n_i^2-n_c^2)/2n_i^2$, where $n_i$ is the maximum refractive index of the index profile segment i, and $n_c$ is the refractive index in the reference region which is usually taken to be the minimum index of the clad layer. The relative refractive index is generally expressed as a percent and is indicated herein by the term % $\Delta$.

For the particular profiles according to the present invention, the core region has one segment. The notation % $\Delta_1$ is used to describe the relative refractive index of this single core segment. The notation % $\Delta_2$ is used to describe the relative refractive index of a first annular region surrounding the core region and having a reduced refractive index, while the notation % $\Delta_3$ is used to describe the relative refractive index of a cladding region surrounding the first annular region.

The term refractive index profile or simply index profile is the relation between % $\Delta$ and radius over a selected portion of the core.

The term alpha profile refers to a core refractive index profile which follows the equation, $$n(r)=n_0(1\Delta[r/a]^\alpha) \qquad (1)$$

where r is core radius, a is the last point in the core profile, r is chosen to be zero at the first point of the profile, $n_0$ is the maximum refractive index of the core, and $\alpha 0$ is an exponent which defines the core profile shape. Other core refractive index profile shapes include a step index, a trapezoidal index and a rounded step index, in which the rounding is due to dopant diffusion in regions of rapid refractive index change.

DETAILED DESCRIPTION

The invention disclosed and described herein relates to a single mode optical fiber in which the non-linearity of the optical fiber is enhanced. This is in contrast to recent core design work which was undertaken to reduce non-linear effects by increasing the effective area of the waveguide. Also disclosed is a method for making the novel optical fiber.

Figure 1:
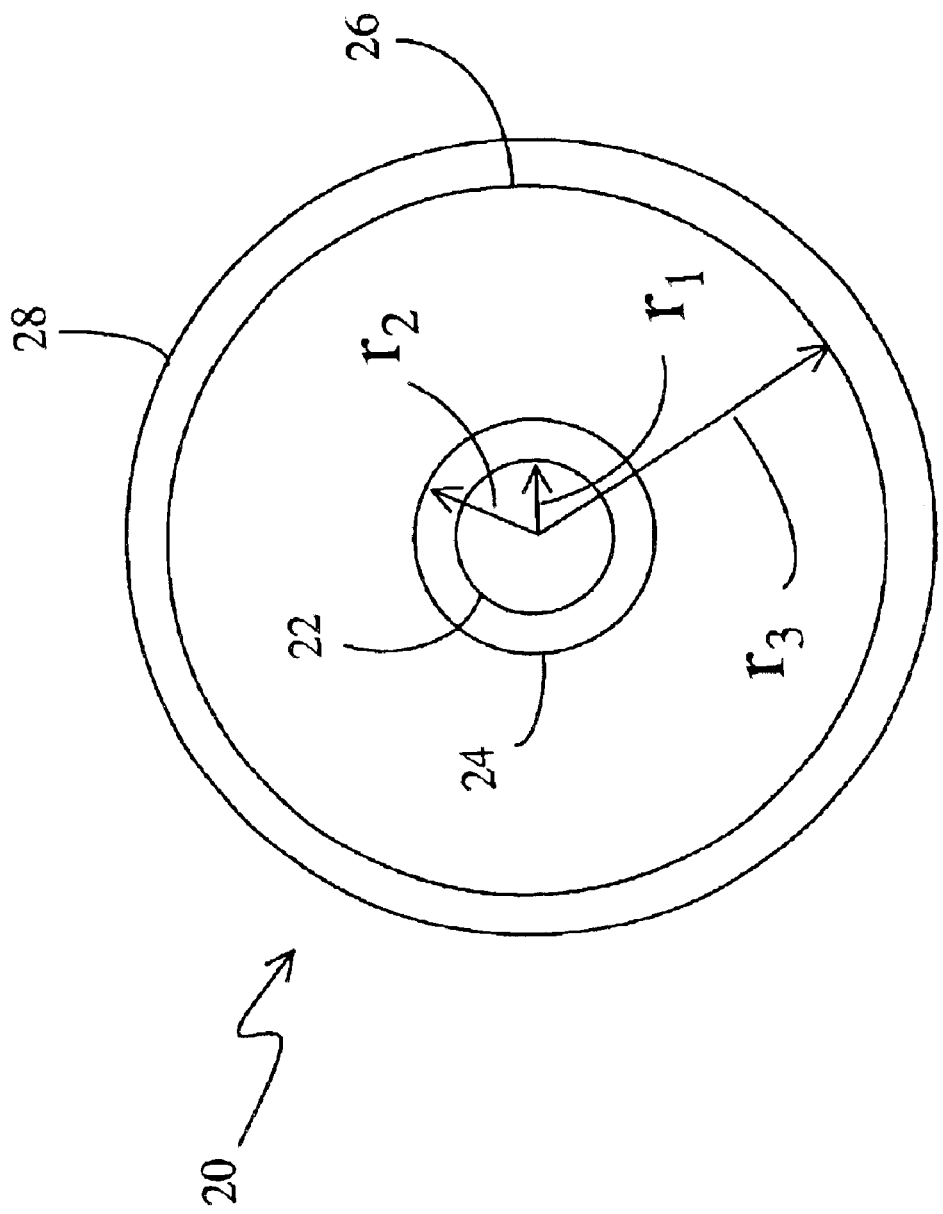
FIG. 1 is a schematic of a cross section of the optical fiber of the present invention.

A cross section of the nonlinear positive dispersion optical fiber 20 according to the present invention is depicted in FIG. 1. The nonlinear positive dispersion optical fiber comprises a longitudinal center axis, a core region 22 disposed about the center axis, a first annular region (sometimes referred to as a moat) 24, and a cladding region 26. The core region has an outer radius $r_1$, a maximum refractive index value of $n_1$, and a relative refractive index with respect to cladding 26 of % $\Delta_1$. Preferably $r_1$ is between about 1.7 μm and 3 μm, more preferably between about 1.7 μm and 2.2 μm, and most preferably between about 1.8 μm and 2 μm. Preferably % $\Delta_1$ is between about 2% Δand 2.6%, more preferably between about 2% and 2.2%. Moat 24 is disposed about and in contact with an outer periphery of the core region 22, and has an outer radius $r_2$, a minimum refractive index value of $n_2$ (where $n_2<n_1$), and a relative refractive index with respect to the cladding % $\Delta_2$. Preferably $r_2$ is between about 6 μm and 8 μm, more preferably about 7 μm. Preferably % $\Delta_2$ is between about −0.4% and −1%, more preferably between about −0.4% and −0.8%. Cladding region 26 is disposed about and in contact with an outer periphery of first annular region 24 and has an outer radius $r_3$, a maximum refractive index value of $n_3$ (where $n_2<n_3<n_1$), and a relative refractive index with respect to pure silica % $\Delta_3$. Preferably, $r_3$ is about 62.5 μm. Preferably, cladding region 26 is pure silica and % Δ3=0. Preferably nonlinear positive dispersion optical fiber 20 is coated with a protective polymer coating 28. The protective coating 28 may comprise one or more layers. Preferably the protective coating comprises at least two layers.

Core region 22 of nonlinear positive dispersion optical fiber 20 is comprised of $SiO_2$ doped with a pre-determined amount of a dopant to raise the refractive index of core region 22 to $n_1$ ($n_1>n_o$, where $n_o$ is the refractive index of pure $SiO_2$). Preferably the core region 22 dopant comprises $GeO_2$.

Moat 24 has an outer diameter of $r_2$ and is formed by doping $SiO_2$ glass with a predetermined amount of a dopant for lowering the refractive index, wherein its refractive index attains a minimum value of $n_2$ ($n_2<n_o$, $n_2<n_1$). Preferably moat 24 is doped with F. Cladding region 26 has an outer radius of $r_3$. Cladding region 26 may be comprised of pure silica, or cladding region 26 may be formed by doping $SiO_2$ glass with a predetermined amount of a dopant suitable for adjusting the refractive index, wherein the refractive index of cladding region 26 attains a maximum value of $n_3$ ($n_3 \geq n_o$, $n_2<n_3<n_1$). Preferably, cladding region 26 is pure silica.

Preferably, nonlinear positive dispersion optical fiber 20 has a total dispersion at a wavelength of 1550 nm of between about 4 ps/nm/km and 8 ps/nm/km, more preferably between about 6 ps/nm/km and 8 ps/nm/km. It is desirable that the dispersion slope at 1550 nm be as low as possible. Preferably, the nonlinear positive dispersion optical fiber has a dispersion slope less than about 0.06 ps/nm²/km at a wavelength of 1550 nm, more preferably less than 0.04 ps/nm²/km, and most preferably less than 0.03 ps/nm²/km.

A parameter useful for characterizing the dispersion properties of an optical fiber is the ratio of the total dispersion divided by the dispersion slope, referred to as kappa (K) and having units of nanometers (nm). Preferably the nonlinear positive dispersion optical fiber disclosed herein has a K at a wavelength of 1550 nm between about 250 nm and 550 nm, more preferably between about 290 nm and 455 nm, and most preferably between about 390 nm and 525 nm.

Preferably, nonlinear positive dispersion optical fiber 20 according to the present invention has a ratio of the radius of core region 22 divided by the radius of moat 24 ($r_1/r_2$, core/moat ratio) between about 0.15 and 0.40, more preferably between about 0.3 and 0.4, and most preferably between about 0.20 and 0.30.

Preferably, nonlinear positive dispersion optical fiber 20 has a cutoff wavelength $\lambda_{cf}$, as measured on a two meter length of optical fiber, of less than 1400 nm.

Although the modeled attenuation values in Table 1, infra, suggest an attenuation less than about 0.3 dB/km for the inventive fiber, actual optical fibers according to the present invention are expected to have an attenuation value much higher than the modeled value. Attenuation values between 0.5 dB/km and 1 dB/km are anticipated. Consequently, the nonlinear positive dispersion optical fiber according to the present invention preferably has an optical attenuation less than about 1 dB/km, more preferably less than about 0.5 dB/km, and most preferably less than about 0.3 dB/km.

Figure 2:
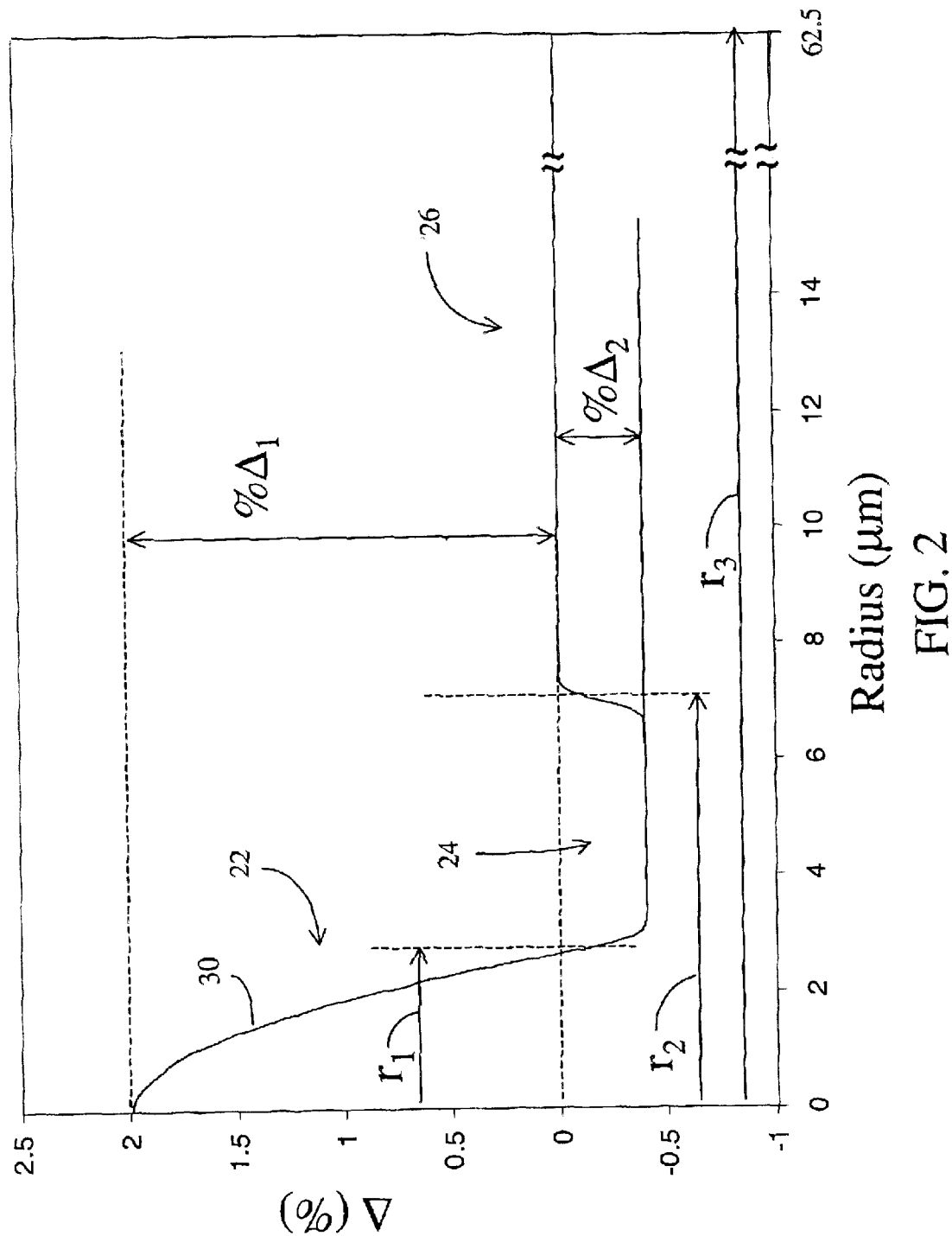
FIG. 2 is a schematic showing the refractive index profile of an embodiment of the optical fiber of the present invention having a core region with an a profile.

In one embodiment of the present invention, the core region 22 of optical fiber 20 has an α-profile. FIG. 2 shows an exemplary refractive index profile 30 depicting relative refractive index as a function of radius for this embodiment of nonlinear positive dispersion fiber 20. FIG. 2 further illustrates various regions and parameters of the optical fiber refractive index profile 30 as referenced herein. The optical fiber of this embodiment has a core region 22, a moat 24 and a cladding region 26. Core region 22 of the nonlinear positive dispersion optical fiber of this embodiment has an outer radius, $r_1$, a maximum refractive index $n_1$, and a relative refractive index with respect to cladding region 26 of % $\Delta_1$. In this embodiment, core region 22 preferably has an a of about 2. Moat 24 is disposed about and in contact with the outer periphery of core region 22. Moat 24 has an outer radius $r_2$, a minimum refractive index $n_2$ (where $n_2<n_1$), and a relative refractive index % $\Delta_2$. Cladding region 26 is disposed about and in contact with the outer periphery of moat 24. Cladding region 26 has an outer radius $r_3$, a maximum refractive index $n_3$ (where $n_2<n_3<n_1$), and a relative refractive index with respect to pure silica of % $\Delta_3$. Preferably, % $\Delta_3=0$. In FIG. 2, radius $r_1$ is defined as the radius of refractive index profile 30 where core region 22 crosses the $\Delta$ (%) axis at a value of zero, $r_2$ is defined as the radius of refractive index profile 30 profile at % $\Delta_2/2$ and $r_3$ is the radius at the outer periphery of cladding region 26. Preferably $r_3$ is about 62.5 μm. A summary of optical fiber attributes modeled at a wavelength of 1550 nm for refractive index profile 30 displayed in FIG. 2 is provided in Table 1, infra.

Figure 3:
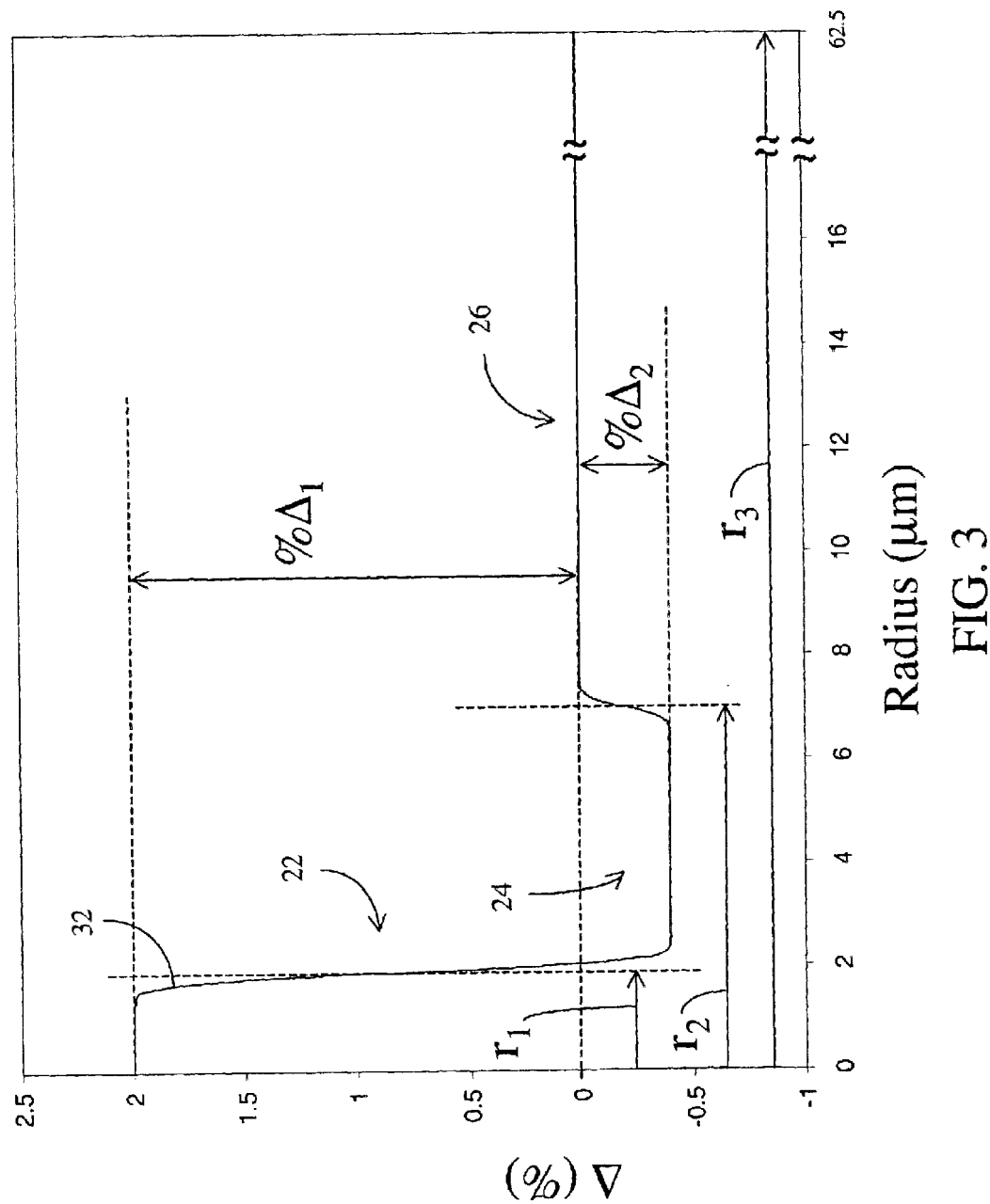
FIG. 3 is a schematic showing the refractive index profile of an embodiment of the optical fiber of the present invention having a core region with a step index profile.
Figure 4:
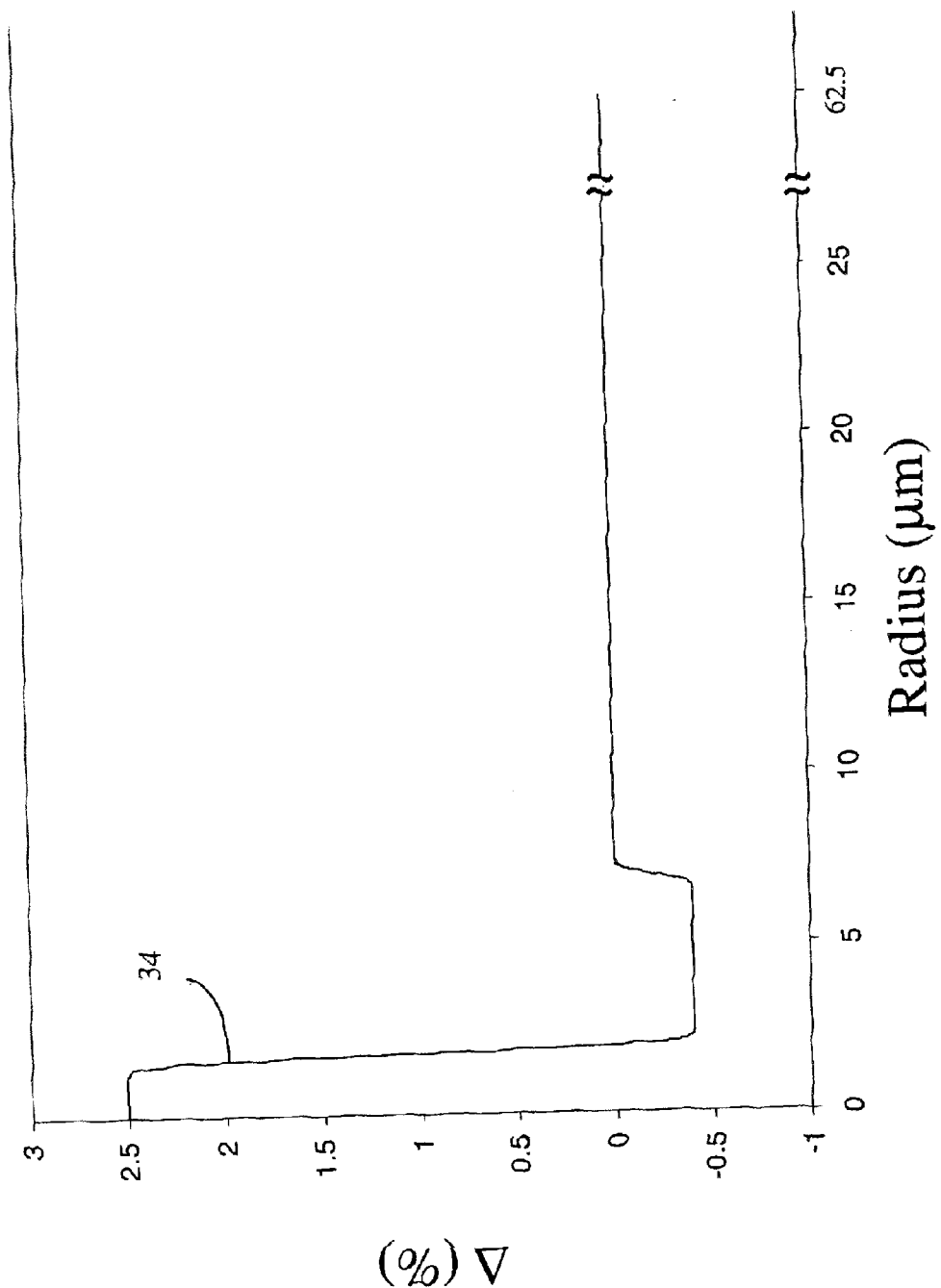
FIGS. 4–7 are schematics showing additional examples of refractive index profiles according to the present invention having a core region with a step index profile.
Figure 5:
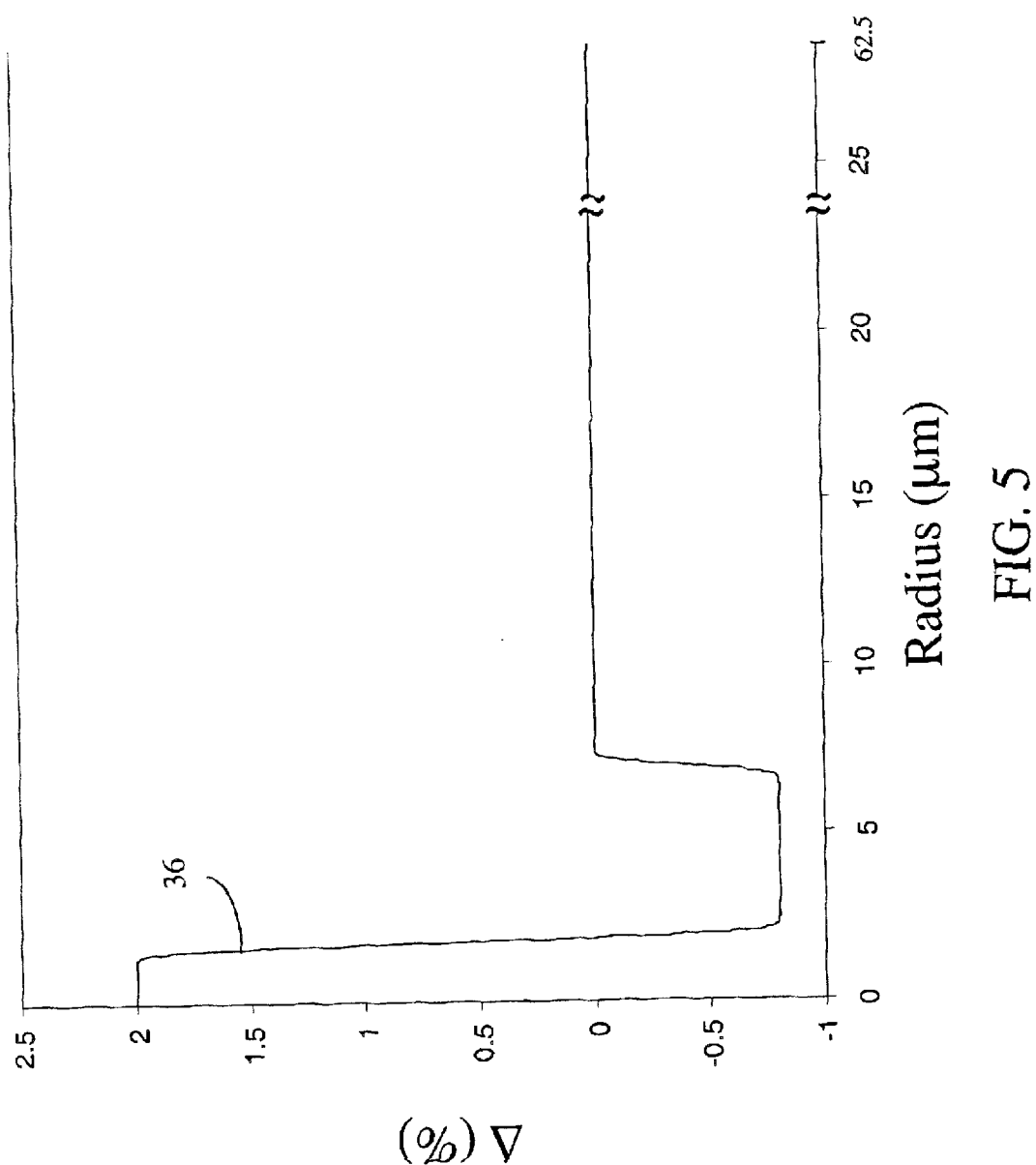
Figure 6:
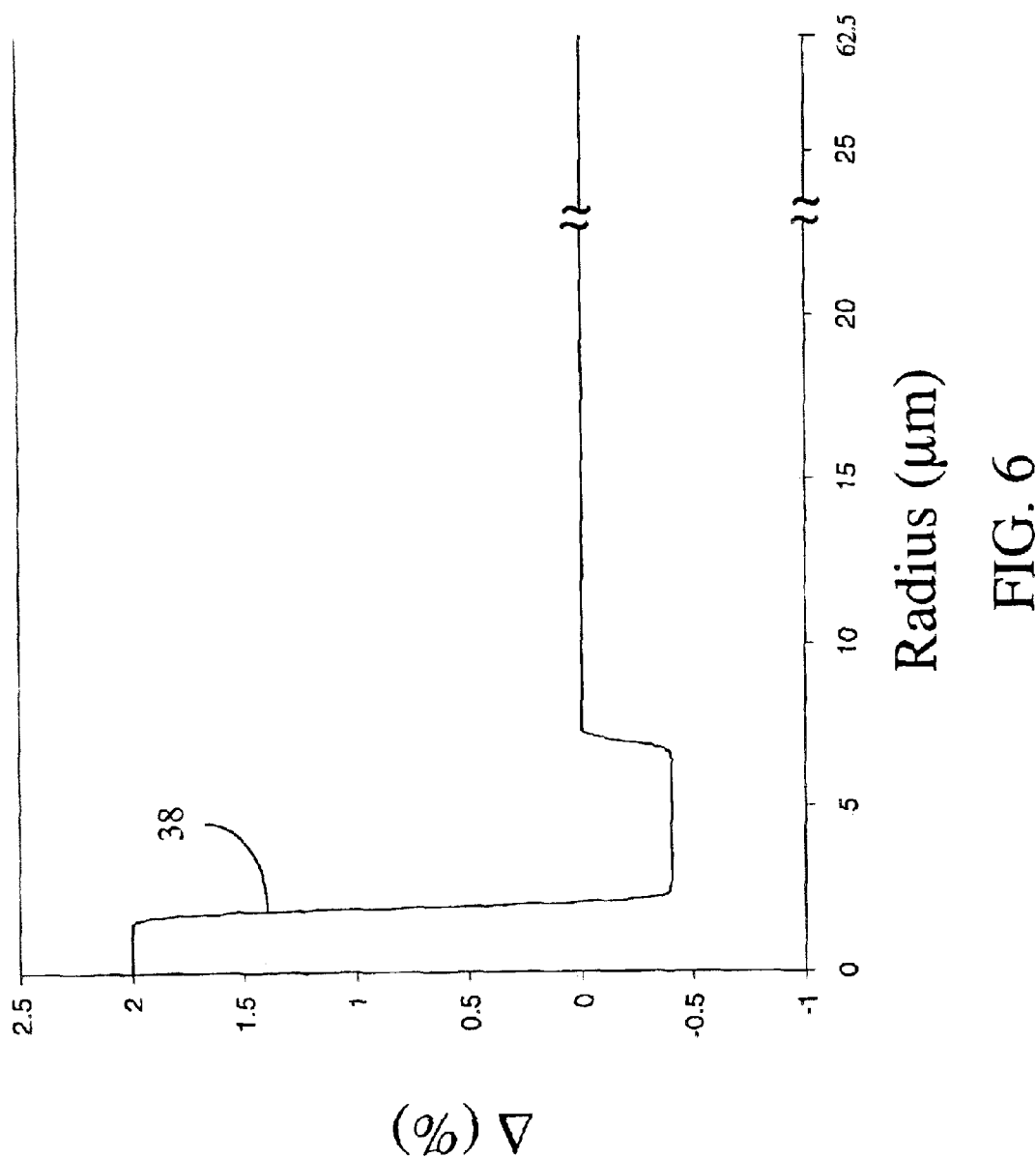
Figure 7:
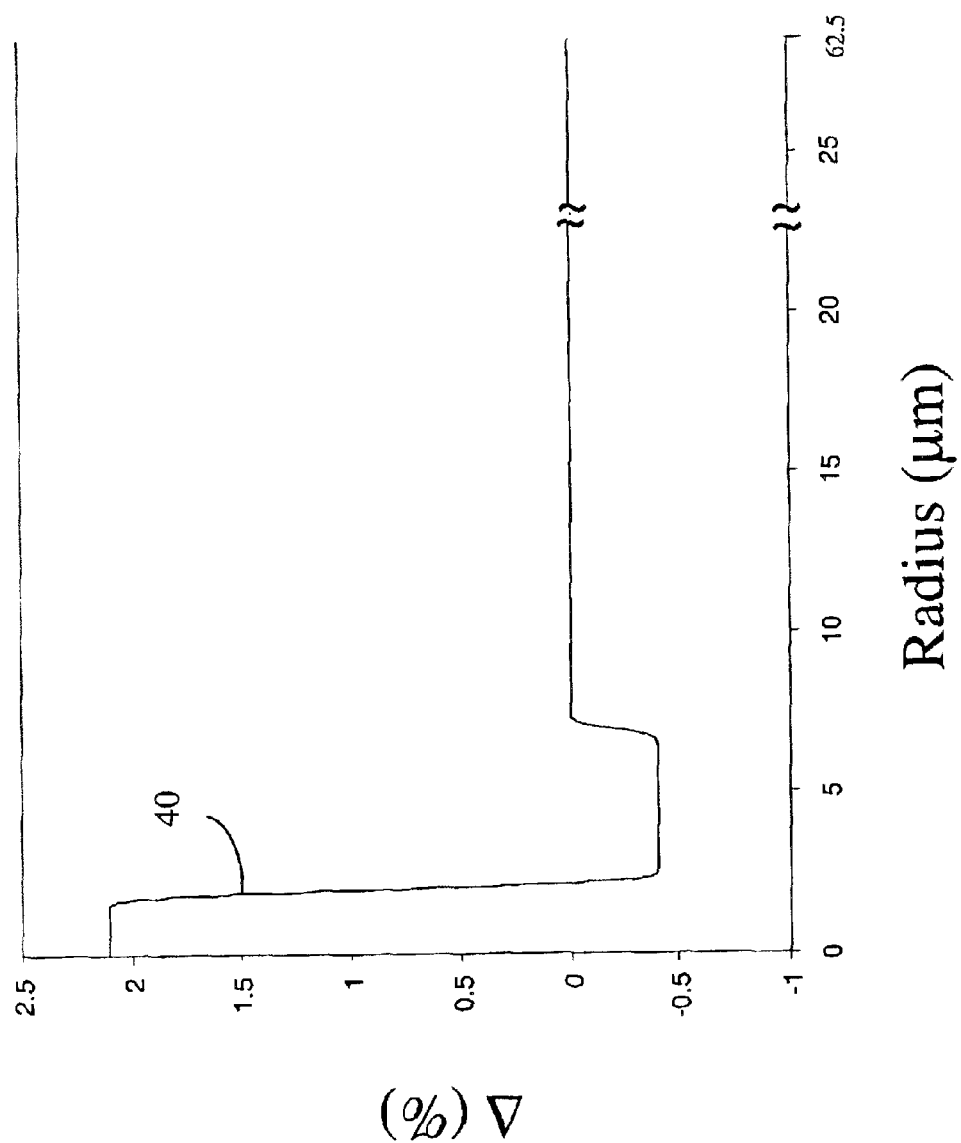

The effective area of the inventive optical fiber can be decreased by changing the core from an alpha profile to a step index design. In another embodiment of the present invention, nonlinear optical fiber 20 has a core region 22 generally in the shape of a step (step index), a moat 24 and a cladding region 26. This embodiment is shown by refractive index profile 32 in FIG. 3. FIG. 3 further illustrates various regions and parameters of the optical fiber refractive index profile 32 as referenced herein. It is intended that these regions and parameters apply also to the refractive index profiles (34–40) depicted in FIGS. 4–7. Core region 22 of the nonlinear positive dispersion optical fiber of this embodiment has an outer radius, $r_1$, a maximum refractive index $n_1$, and a relative refractive index of % $\Delta_1$. Moat 24 is disposed about and in contact with the outer periphery of core region 22. Moat 24 has an outer radius $r_2$, a minimum refractive index $n_2$ (where $n_2<n_1$), and a relative refractive index % $\Delta_2$. Cladding region 26 is disposed about and in contact with the outer periphery of moat 24. Cladding region 26 has an outer radius $r_3$, a maximum refractive index $n_3$ (where $n_2<n_3<n_1$), and a relative refractive index with respect to pure silica % $\Delta_3$. Preferably cladding region 26 is pure silica and % $\Delta_3=0$. In FIG. 3, radius $r_1$ is defined as the radius of refractive index profile 32 at a delta value of % $\Delta_1/2$ and radius $r_2$ is defined as the radius of refractive index profile 118 at a delta value of % $\Delta_2/2$. In FIG. 3 (and FIGS. 4–7), % $\Delta_3=0$ and is not shown. Radius $r_3$ is defined as the radius at the outer periphery of cladding region 26. A summary of optical fiber attributes modeled at a wavelength of 1550 nm for refractive index profile 32–40 displayed in FIG. 3 is provided in Table 1, infra.

TABLE 1

| Profile | 30 | 32 | 34 | 36 | 38 | 40 |
| --- | --- | --- | --- | --- | --- | --- |
| $\lambda_{cf}$ (nm) | 1243 | 1267 | 1363 | 1145 | 1314 | 1390 |
| MFD (μm) | 4.47 | 4.05 | 3.72 | 3.79 | 4.1 | 4.1 |
| $A_{eff}$ (μm²) | 15.2 | 12.9 | 11.0 | 11.4 | 13.3 | 13.4 |
| D (ps/nm/km) | 4.0 | 4.1 | 4.1 | 4.1 | 7.0 | 10 |
| S (ps/nm²/km) | 0.0475 | 0.0281 | 0.0251 | 0.0236 | 0.0312 | 0.0345 |
| K (nm) | 84.2 | 145.9 | 163.3 | 173.7 | 224.4 | 289.9 |
| Att (dB/Km) | 0.232 | 0.266 | 0.281 | 0.278 | 0.264 | 0.265 |
| $r_1$ (μm) | 2.9 | 1.89 | 1.79 | 1.8 | 1.96 | 2.02 |
| $\Delta_1$ (%) | 2 | 2 | 2.5 | 2 | 2 | 2.1 |
| $r_2$ (μm) | 7 | 7 | 7 | 7 | 7 | 7 |
| $\Delta_2$ (%) | −0.4 | −0.4 | −0.4 | −0.8 | −0.4 | −0.4 |
| $r_3$ (μm) | 62.5 | 62.5 | 62.5 | 62.5 | 62.5 | 62.5 |
| $\Delta_3$ (%) | 0 | 0 | 0 | 0 | 0 | 0 |
| $r_1/r_2$ | 0.41 | 0.27 | 0.26 | 0.26 | 0.28 | 0.29 |

In Table 1, $\lambda_{cf}$ is the fiber cutoff wavelength when measured on a 2 meter length of optical fiber, MFD is the mode field diameter, $A_{eff}$ is the effective area, D is the total dispersion, S is the dispersion slope, K is the ratio of dispersion divided by the dispersion slope, Att. is the optical fiber attenuation, and $r_1/r_2$ is the ratio of core radius $r_1$ divided by moat radius $r_2$.

As shown in Table 1, the effective area for optical fiber refractive index profile 32 is 12.9 μm². The effective area may be further reduced by increasing the core region delta, % $\Delta_1$. This can be seen by examining refractive index profile 34 depicted in FIG. 4. Here, the optical fiber represented by refractive index profile 34 has attained a modeled effective area of 11.0 μm² by increasing % $\Delta_1$ by 0.5% compared to profile 30. Meanwhile, the total dispersion at 1550 nm has been maintained at approximately 4.1 ps/nm/km.

Alternatively, the effective area of the optical fiber of the present step index embodiment may also be reduced by decreasing % $\Delta_2$. In the refractive index profile of the present embodiment depicted in FIG. 5 as refractive index profile 36, the % $\Delta_2$ has been reduced to −0.8%. The result is an effective area of about 11.4 μm², approximately equivalent to the effective area in the case above (profile 34) wherein % $\Delta_1$ was increased.

The total dispersion of the inventive fiber may be changed by varying other refractive index profile parameters, such as, for example, core radius. Refractive index profile 38, shown in FIG. 6, has a modeled total dispersion of about 7 ps/nm/km at a wavelength of 1550 nm. The core radius of this refractive index profile is about 1.96 μm. By way of comparison, refractive index profile 40, shown in FIG. 7 has a core radius of about 2.02 μm and the total dispersion is increased to about 10 ps/nm/km.

Figure 8:
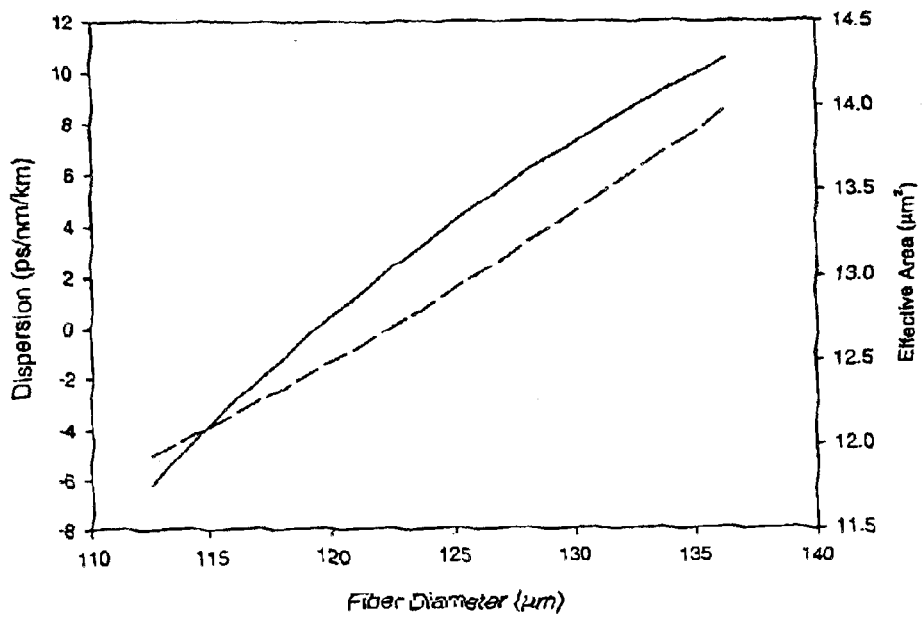
FIGS. 8–9 depict dispersion and effective area as a function of fiber diameter for several optical fibers according to the present invention.
Figure 9:
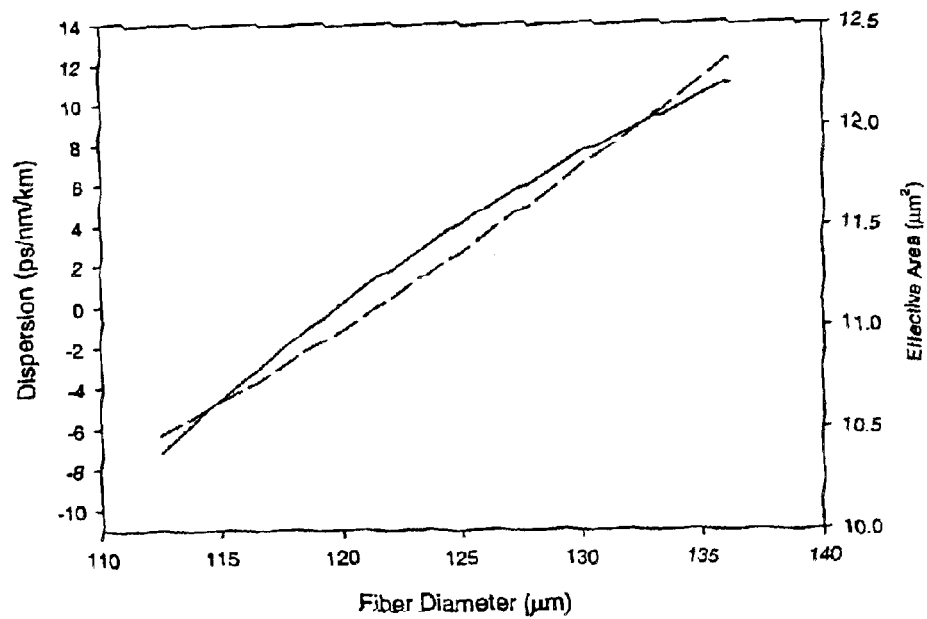

The nonlinear positive dispersion optical fiber according to the present invention is also suitable for making dispersion decreasing optical fiber. This can be done by varying the cladding diameter during the optical fiber draw process. To illustrate a varying total dispersion property, FIGS. 8 and 9 plot total dispersion, shown by the solid line, as a function of fiber diameter for refractive index profiles 32 and 36, respectively. In the same figures, the effective area change with optical fiber cladding diameter, shown by the dashed line, is also shown. It is clear from FIGS. 8 and 9 that when optical fiber cladding diameter is reduced, both the total dispersion and the effective area decrease. For application involving so-called soliton pulse propagation regime, this is a preferred result because the decrease in dispersion and effective area both result in a decrease of the fundamental soliton power which may compensate some power loss due to the attenuation of the optical fiber.

The nonlinear positive dispersion fibers disclosed herein can be fabricated by the skilled artisan, for example, using germanium and fluorine-doping of silica glass with standard OVD, MCVD, PCVD or VAD methods. However, regardless of the method employed, the relatively high core region delta required for the optical fiber requires a means of incorporating sufficient $GeO_2$ in the core. Moreover, some profile designs according to the present invention may require core region deltas as high as 4%, which may be difficult to achieve because the high $GeO_2$ concentration required in the core region may be as high as 63 weight % (wt. %) or more. Such high $GeO_2$ concentrations in the core region may lead to high GTE mismatch between the core region and the outlying first annular region or the cladding region. GTE mismatch may in turn lead to spontaneous fracturing (crizzling) of the optical fiber preform as the preform cools. GTE mismatch may also result in high residual stress and increased attenuation after drawing of the fiber.

Figure 10:
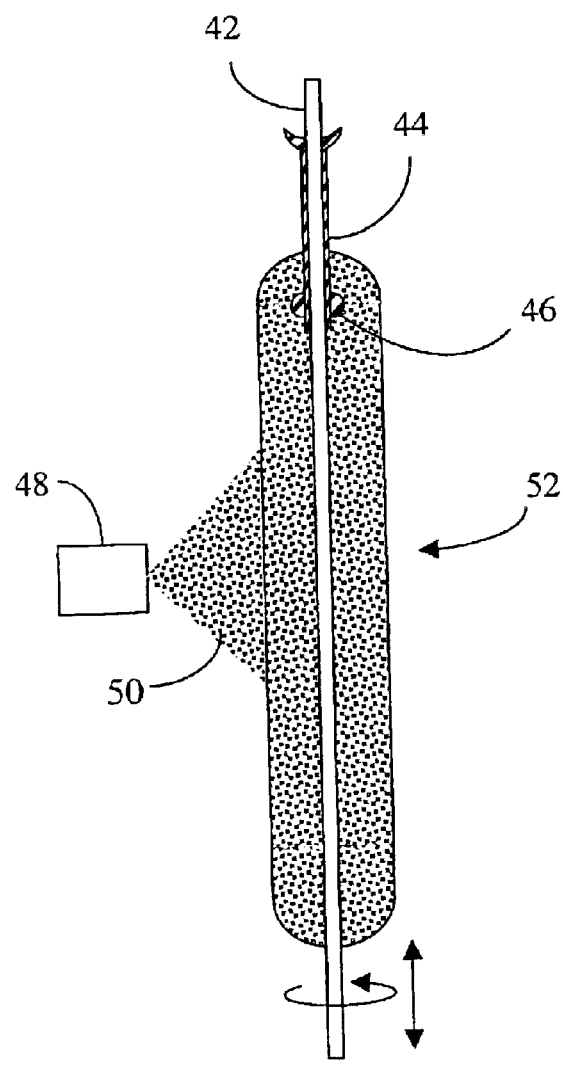
FIG. 10 illustrates the application of a coating of glass soot to a mandrel.

In a method of making the optical fiber according to the present invention, an optical fiber core preform is manufactured by outside vapor deposition (OVD) as illustrated in FIGS. 10–16. A circularly symmetric porous preform may be formed in accordance with the method illustrated in FIG. 10. In the method shown in FIG. 10, an optical fiber core blank is formed by a method similar to that disclosed in U.S. Pat. No. 4,486,212 (Berkey). Referring to FIG. 10, the large diameter end of a tapered mandrel 42 is inserted into glass tube 44, hereinafter referred to as handle 44, having annular protrusion 46. Shims (not shown) can be used to secure handle 44 to mandrel 42 as disclosed in U.S. Pat. No. 4,289,517. The mandrel may be provided with a layer of carbon soot to facilitate removal of the soot preform. Mandrel 42 is rotated and translated with respect to a burner 48 of the type disclosed in U.S. Pat. No. 4,165,223. Fuel gas and oxygen or air are supplied to burner 48 from a source (not shown). This mixture is burned to produce a flame which is emitted from burner 48. A gas-vapor mixture is oxidized within the flame to form a soot stream 50 which is directed toward mandrel 42. Suitable means for delivering the gas-vapor mixture to burner 48 are well known in the art; for an illustration of such means reference is made to U.S. Pat. Nos. 3,826,560, 4,148,621 and 4,173,305. One or more auxiliary burners (not shown) may be employed to direct a flame toward one or both ends of the porous soot preform during deposition to prevent breakage; the use of auxiliary burners is taught in U.S. Pat. No. 4,810,276 (Gilliland).

Figure 11:
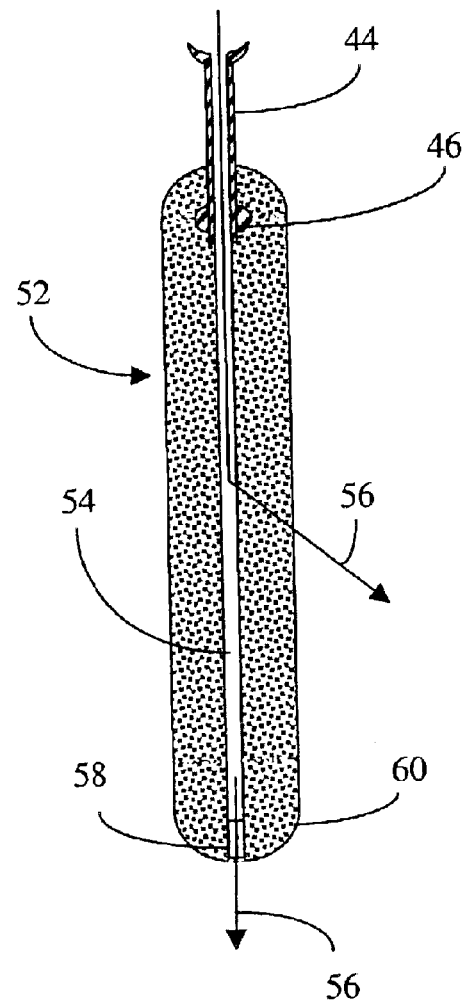
FIG. 11 is a schematic showing a porous glass preform.

Burner 48 is generally operated under conditions that will provide acceptably high laydown rates and efficiency while minimizing the buildup of soot on the face thereof. Under such conditions, the flow rates of gases and reactants from the burner orifices and the sizes and locations of such orifices as well as the axial orientation thereof are such that a well focused stream of soot flows from burner 48 toward mandrel 42. In addition, a cylindrical shield (not shown) which is spaced a short distance from the burner face, protects the soot stream from ambient air currents and improves laminar flow. Porous soot core preform 52 is formed by traversing mandrel 42 many times with respect to burner 48 to cause a build-up of many layers of silica soot. The translating motion could also be achieved by moving burner 48 back and forth along rotating mandrel 42 or by the combined translational motion of both burner 48 and mandrel 42. Core preform 52 may contain only core glass, or alternatively, the core preform may contain at least a portion of the cladding glass. After the deposition of soot core preform 52, mandrel 42 is pulled therefrom, and the mandrel is removed through handle 44, thereby leaving a longitudinal aperture 54, as shown in FIG. 11, in the porous preform through which drying gas 56 may be flowed during consolidation. Protrusion 46 causes preform 52 to adhere to handle 44; handle 44 supports preform 52 during subsequent processing.

The steps of drying and consolidating the optical fiber core preform may be performed in accordance with the teachings of U.S. Pat. No. 4,165,223, which patent is hereby incorporated by reference.

During consolidation, core preform 52 may be suspended by handle 44. Prior to the introduction of drying gas 56, optical fiber core preform 52 is heat treated in the presence of oxygen to stabilize the GeO2 content of optical fiber core preform 52. During the laydown step Ge takes on two forms—an amorphous Ge and a crystalline Ge. The amorphous Ge is stable and will be retained in the preform during the consolidation step. However, crystalline Ge is very volatile and may be easily removed during the drying step by the chlorine drying gas. The presence of oxygen serves to stabilize the crystalline Ge, and therefore improving Ge retention in the core region. Preferably, between 0.05 and 30 volume % (vol. %) oxygen is employed, more preferably between about 0.05 vol. % and 10 vol. %, and most preferably between about 0.05 vol. % and 5 vol. %. The oxygen may be combined with an inert gas, such as, for example, helium, argon, or nitrogen. Preferably core preform is exposed to oxygen between 15 and 360 minutes at a temperature between 800° C. and 1200° C.

Figure 12:
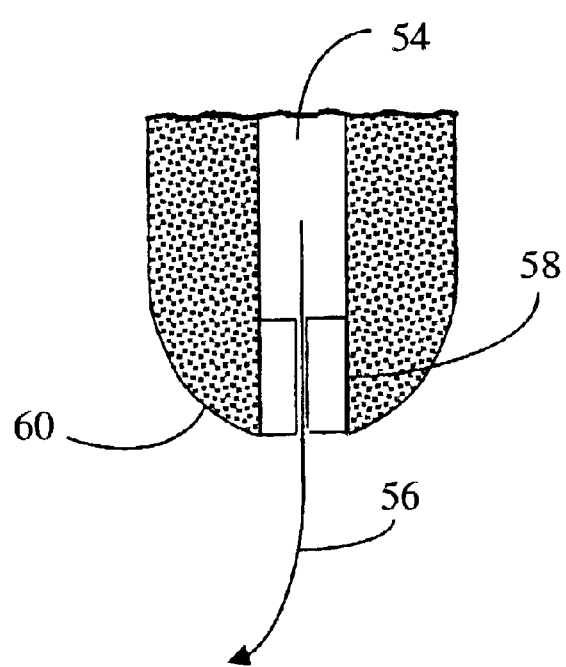
FIG. 12 is a detailed view of one end of a porous glass preform.

After stabilizing the Ge content of the optical fiber core preform, the preform is dried. Drying can be facilitated by inserting a short section of capillary tube 58 into that end 60 of the porous preform aperture 54 opposite handle 44. Capillary tube 58 initially permits some of the drying gas to flush water from the central region of the core preform. As porous preform 52 is inserted into a consolidation furnace to dry and consolidate the preform, the capillary tube aperture closes to form a solid plug, thereby causing all drying gas 56 to thereafter flow through the preform interstices. A detailed view of end 60 is shown in FIG. 12.

The consolidation atmosphere may contain helium and oxygen and an amount of chlorine. Chlorine gas is included to aid in water removal from the preform. In particular, chlorine permeates the interstices of the soot preform and flushes out any OH, $H_2$ or $H_2O$ contained therein. Core preform 52 is then heated at a high temperature (generally in the range of between about 1450° C. to about 1600° C., depending upon preform composition) until the deposited soot consolidates and transforms into a solid, high-purity glass having superior optical properties. Once preform 52 is consolidated, it is removed from the furnace and transferred to an argon-filled holding vessel.

Figure 13:
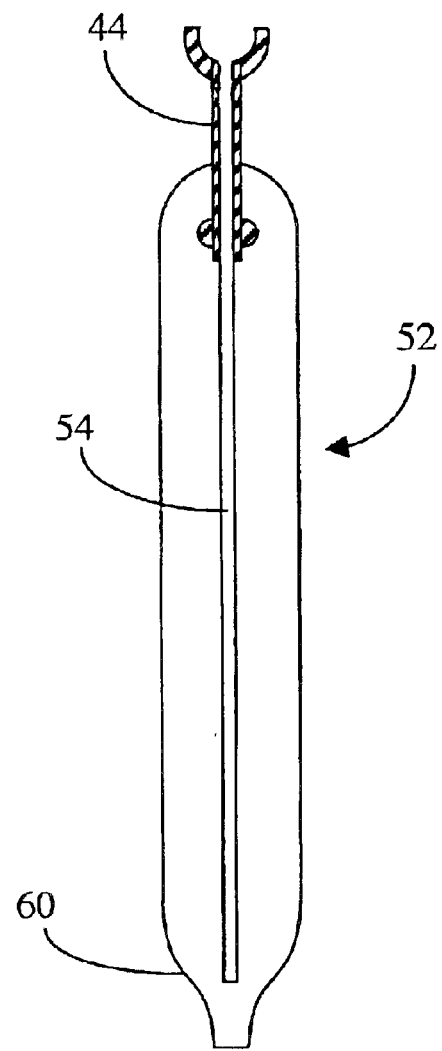
FIG. 13 is a cross-sectional view of a consolidated glass preform.

After consolidation, the consolidated optical fiber core preform aperture 54 will be closed at end 60 as shown in FIG. 13 due to the presence of the aforementioned capillary plug. If no plug is employed the entire aperture will remain open. In this event end 60 is closed after consolidation by a technique such as heating and pinching the same.

Consolidated core preform 52 of FIG. 13, which will form at least a portion of the core of the resultant optical fiber, is etched to remove a thin surface layer. It is then stretched into at least one intermediate article (core cane), which is thereafter provided with additional core glass or with a cladding glass.

For certain soot compositions including pure silica, conventional soot deposition techniques result in the formation of a devitrified layer on the aperture-forming surface of the resultant glass preform during the consolidation process. If such a devitrified layer exists in the preform, it should be removed by etching to prevent the formation of seeds in the resultant fiber. If aperture 54 closes during consolidation, end 60 must be severed to permit an acid wash to flow freely through aperture 54 in order to effectively remove the devitrified layer. Thereafter, the aperture is rinsed and dried, and end 60 is heated and sealed.

A preferred method of forming a silica soot preform, which is disclosed in U.S. Pat. No. 4,453,961, prevents devitrification of the aperture-forming surface during consolidation. That method comprises depositing the first plurality of layers of glass soot on the mandrel at a deposition rate that is sufficiently low that no spiral pattern of deposited soot is visible. The deposition of a fine, spiral-free coating on mandrel 42 can be accomplished by supplying burner 48 with a greatly reduced flow of reactant. The absence of a high velocity reactant vapor stream emanating from the burner tends to generate a defocused soot stream 50 that is incapable of depositing a coating of soot having a sufficient density variation to appear as a spiral. After many layers are deposited, the fine soot stream becomes continuous.

After the unfocused soot stream has been employed for a time sufficient to build up a continuous layer, the flow of reactants to the burner is increased to conventional rate, and the remainder of preform 52 is deposited at a normal high deposition rate.

Figure 14:
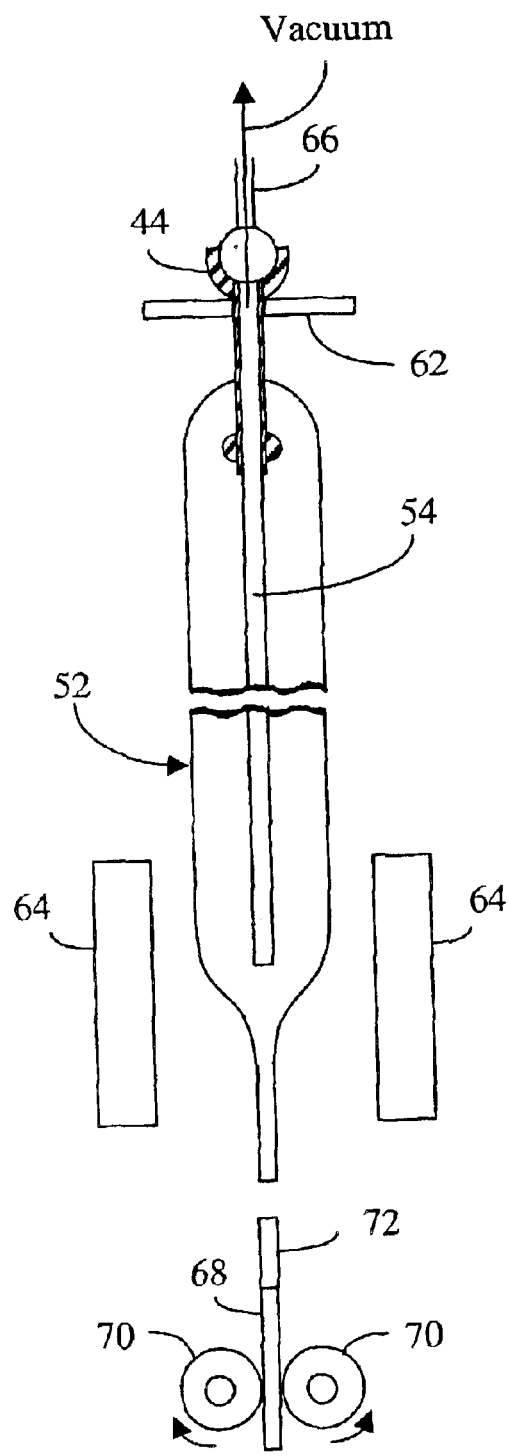
FIG. 14 is a schematic diagram illustrating the drawing of a core cane from a consolidated preform.

The core cane can be formed in a conventional draw furnace wherein the tip of the consolidated preform from which the core cane is being drawn is heated to a temperature which is slightly lower than the temperature to which the preform would be subjected to draw optical fiber therefrom. A temperature of about 1900° C. is suitable for a silica preform. A suitable method for forming a core cane is illustrated in FIG. 14. Perform 52 is mounted in a conventional draw furnace by yoke 62, within which handle 44 is seated, and the tip of preform 52 is heated by resistance heater 64. A vacuum connection 66 is attached to handle 44, and preform aperture 54 is evacuated. A glass rod 68, which is attached to the bottom of preform 52, is pulled by motor-driven tractors 70, thereby causing the core cane 72 to be drawn at a suitable rate. A rate of 15 to 23 cm/min has been found to be adequate. As core cane 72 is drawn, aperture 54 readily closes since the pressure therein is low relative to ambient pressure. The diameter of core cane 72 that is to be employed as a mandrel upon which cladding soot is to be deposited is preferably in the range of 4 to 10 mm.

Figure 15:
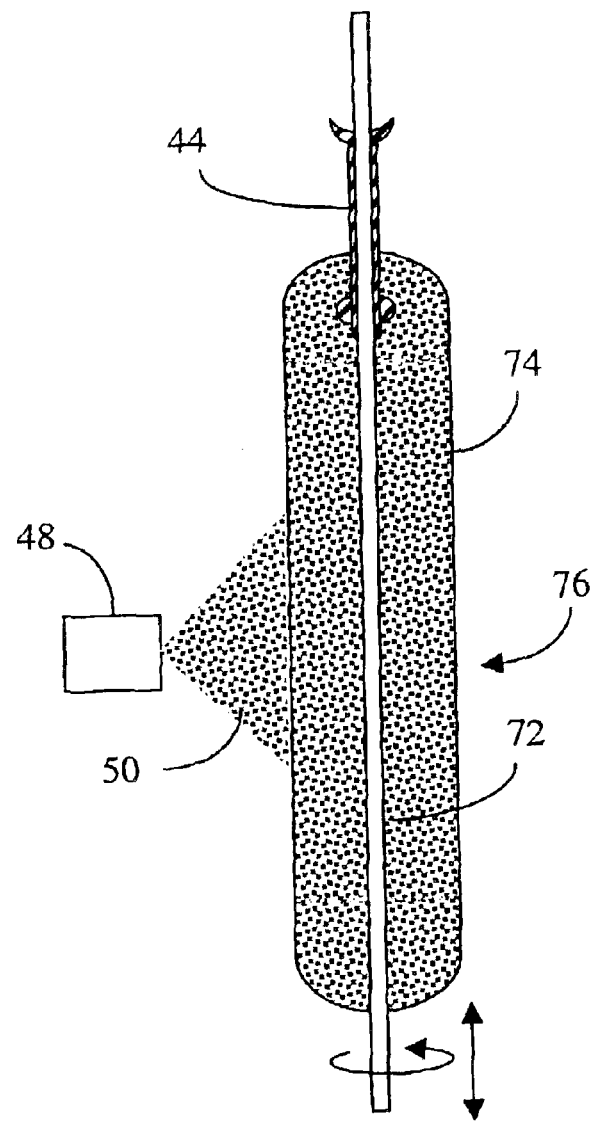
FIG. 15 illustrates the application of a coating of glass cladding soot to a core cane.
Figure 16:
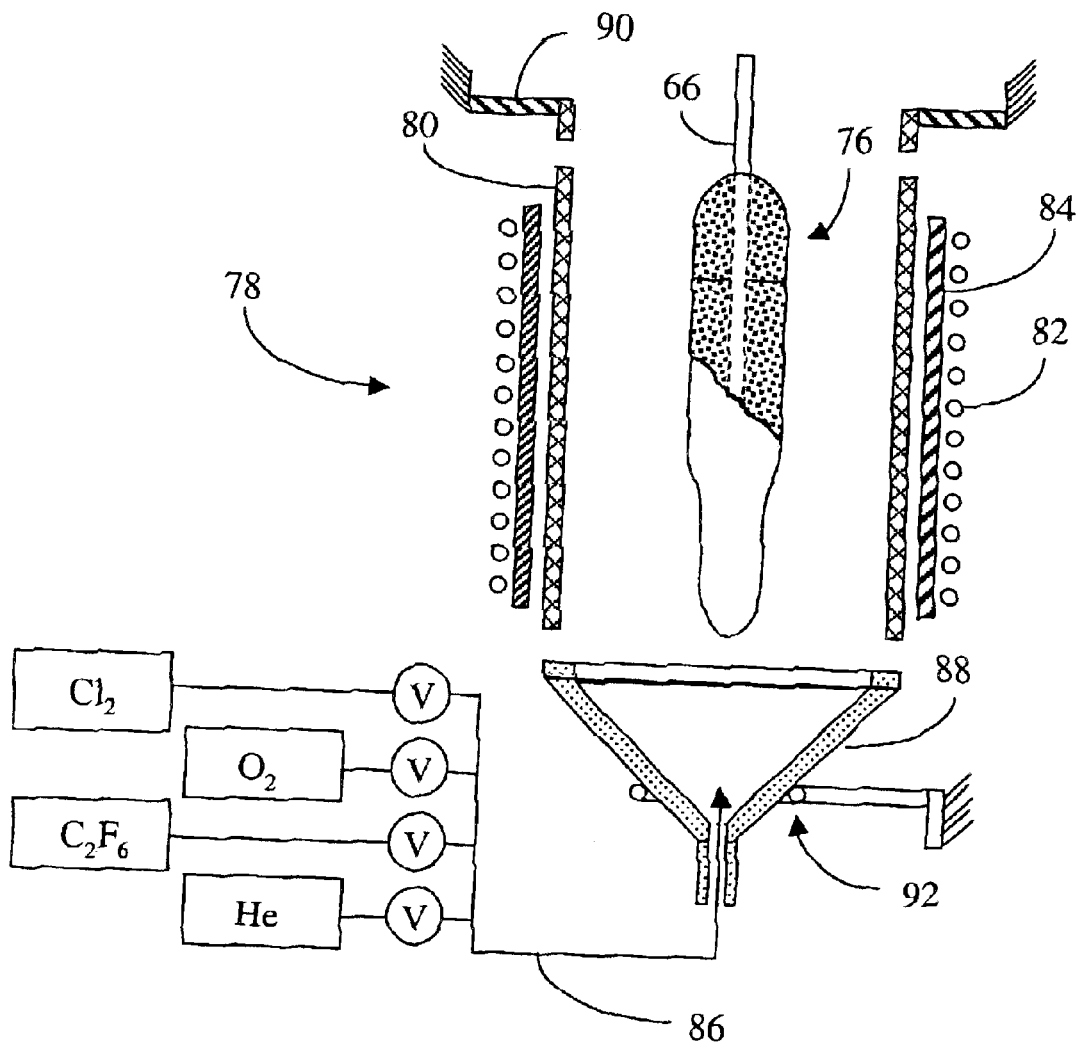
FIG. 16 is a schematic representation of a consolidation furnace and consolidation atmosphere system.

Core cane 72 is mounted in a lathe where it is rotated and translated with respect to burner 48 shown in FIG. 15. A coating 74 of silica soot is thereby built up on the surface thereof to form a composite preform 76. Composite preform 76 is heated in consolidation furnace 78, shown in FIG. 16, to form a complete, consolidated optical fiber preform. Consolidation furnace 78 comprises a high silica content muffle 80 surrounded by heating elements 82. A high silica content liner 84 separates heating elements 82 from muffle 80. The term "high silica content" as used herein means pure fused silica or a high silica content glass such as a borosilicate glass. Consolidation gases 86 are fed to the bottom of muffle 84 through a conical section 88 which is affixed thereto. Silica muffle 84 is supported at its upper end by a ring 90. Conical section 88 is supported by ringstand 92. The consolidation gases 86 flow through one or more holes in conical section 88. The complete consolidated optical fiber preform is then further heated in a drawing furnace and drawn into optical fiber.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

We claim:

1. An optical fiber comprising:
   a refractive index profile comprising a core region;
   a first annular region disposed about and in contact with the outer periphery of the core region;
   a cladding region disposed about and in contact with the outer periphery of the first annular region; and
   wherein the refractive index profile is selected to provide an effective area at a wavelength of 1550 nm between about 10 $\mu m^2$ and 16 $\mu m^2$, and a total dispersion at a wavelength of 1550 nm greater than or equal to 4 ps/nm/km and less than or equal to 8 ps/nm/km.

2. The optical fiber of claim 1 wherein the core region further comprises a refractive index $n_1$, the first annular region has a refractive index $n_2$, the cladding region has a refractive index $n_3$, and $n_2 < n_3 < n_1$.

3. The optical fiber of claim 1 wherein the core region is a step index profile.

4. The optical fiber of claim 1 wherein the core region is an α-profile.

5. The optical fiber of claim 4 wherein α is about 2.

6. The optical fiber of claim 1 wherein the total dispersion is greater than or equal to 6 ps/nm/km and less than or equal to 8 ps/nm/km at a wavelength of 1550 nm.

7. The optical fiber of claim 1 wherein the effective area is between about 11 $\mu m^2$ and 14 $\mu m^2$ at a wavelength of 1550 nm.

8. The optical fiber of claim 1 wherein the optical fiber has an attenuation less than about 1 dB/km at a wavelength of 1550 nm.

9. The optical fiber of claim 8 wherein the optical fiber has an attenuation less than about 0.5 dB/km.

10. The optical fiber of claim 1 wherein the optical fiber has a dispersion slope is less than about 0.06 ps/nm$^2$/km at a wavelength of 1550 nm.

11. The optical fiber of claim 1 wherein the optical fiber has a dispersion slope is less than about 0.04 ps/nm$^2$/km at a wavelength of 1550 nm.

* * * * *

UNITED STATES PATENT AND TRADEMARK OFFICE
CERTIFICATE OF CORRECTION

PATENT NO. : 6,952,515 B2 Page 1 of 1
DATED : October 4, 2005
INVENTOR(S) : Dmitri V. Kuksenkov et al.

It is certified that error appears in the above-identified patent and that said Letters Patent is hereby corrected as shown below:

<u>Title page,</u>
Item [75], Inventors, -- Scott R. Bickham, Corning, NY (US) -- should also be listed.

Signed and Sealed this

Thirteenth Day of December, 2005

JON W. DUDAS
*Director of the United States Patent and Trademark Office*

UNITED STATES PATENT AND TRADEMARK OFFICE
CERTIFICATE OF CORRECTION

| | | Page 1 of 1 |
|---|---|---|
| PATENT NO. | : 6,952,515 B2 | |
| APPLICATION NO. | : 10/449970 | |
| DATED | : October 4, 2005 | |
| INVENTOR(S) | : Ming-Jun Li et al. | |

It is certified that error appears in the above-identified patent and that said Letters Patent is hereby corrected as shown below:

Col. 10 line 66

| No. | Col. | Line | Description |
|---|---|---|---|
| 1 | | | Add claims 12-18 which were allowed but omitted. |

12. The optical fiber of claim 1 further comprising a $\square$ value between 80 nm and 300 nm.
13. The optical fiber of claim 10 wherein $\square$ is between 140 nm and 225 nm.
14. The optical fiber of claim 1 further comprising a core relative refractive index $\%\square_1$ between 2% and 2.5%.
15. The optical fiber of claim 1 wherein the core region has a radius $r_1$, the first annular region has a radius $r_2$, and $r_1/r_2$ is between 0.25 and 0.5.
16. The optical fiber of claim 2 wherein a relative refractive index of the first annular region $\%\square_2$ is between -0.4% and -1%.
17. A method of making the optical fiber of claim 1 comprising heat treating a porous optical fiber core preform in the presence of a mixture of oxygen and an inert gas prior to consolidation, where the mixture is between 0.5% by volume and 10% by volume oxygen.
18. The method of claim 17 wherein the heat treating step further comprises treating the core preform at a temperature between 800°C and 1200°C.

Signed and Sealed this

Twenty-second Day of August, 2006

JON W. DUDAS
*Director of the United States Patent and Trademark Office*